United States Patent [19]
Glance

[11] Patent Number: 5,764,821
[45] Date of Patent: Jun. 9, 1998

[54] LARGE CAPACITY LOCAL ACCESS NETWORK

[75] Inventor: Bernard Glance, Colts Neck, N.J.

[73] Assignee: Lucent Technologies Inc., Murray Hill, N.J.

[21] Appl. No.: 742,705

[22] Filed: Nov. 1, 1996

Related U.S. Application Data

[63] Continuation of Ser. No. 350,360, Feb. 6, 1994, abandoned.
[51] Int. Cl.$^6$ .................. G02B 6/12; G02B 6/26; H01J 14/00
[52] U.S. Cl. .................. 385/14; 385/24; 385/37; 385/8; 359/115; 359/118; 359/119; 359/124; 359/127; 359/130
[58] Field of Search .................. 385/14, 2, 4, 8, 385/10, 49, 24, 37, 32, 9; 359/128, 124, 127, 132, 133, 115, 118, 119, 130, 125; 370/452–460, 258

[56] References Cited

U.S. PATENT DOCUMENTS

| | | | |
|---|---|---|---|
| 4,366,565 | 12/1982 | Herskowitz | 359/116 |
| 4,608,682 | 8/1986 | Nagashima et al. | 385/2 |
| 4,726,011 | 2/1988 | Ih et al. | 370/3 |
| 4,815,081 | 3/1989 | Mahlein et al. | 372/29 |
| 4,909,584 | 3/1990 | Imoto et al. | 385/16 |
| 5,002,350 | 3/1991 | Dragone | 385/37 |
| 5,064,263 | 11/1991 | Stein | 385/14 |
| 5,136,671 | 8/1992 | Dragone | 385/46 |
| 5,206,920 | 4/1993 | Cremer et al. | 385/37 |
| 5,233,187 | 8/1993 | Sakata et al. | 385/37 X |
| 5,339,370 | 8/1994 | Sano et al. | 385/2 |
| 5,355,237 | 10/1994 | Lang et al. | 359/130 |
| 5,369,516 | 11/1994 | Uchida | 359/125 |
| 5,396,507 | 3/1995 | Kaminow et al. | 372/20 |
| 5,434,937 | 7/1995 | Glance | 385/24 |
| 5,461,685 | 10/1995 | Glance et al. | 385/24 |
| 5,504,827 | 4/1996 | Schimpe | 385/24 |
| 5,519,796 | 5/1996 | Li et al. | 385/24 |
| 5,542,010 | 7/1996 | Glance et al. | 385/14 |

OTHER PUBLICATIONS

Lee et al., "Novel optical techniques for charaterization of advanced semiconductor lasers for telecommunications", Abstract (Proceeding of the SPIE); Int. Soc. Opt. Eng., vol. 2148, pp. 406–414, 1994.

C. Dragone et al., "Integrated Optics N×N Multiplexer on Silicon," IEEE Photon. Technol. Lett., vol. 3, No. 10, pp. 896–899, Oct. 1991.

M. Zirngibl et al., "Demonstration of a 15×15 Arrayed Waveguide Multiplexer on InP," Postdeadline Paper, PD3, LEOS Summer Topical Meeting on Integrated Optoelectronics, Aug. 1992.

D. Marcuse, "Derivation of Analytical Expressions for the Bit–Error Probability in Lightwave Systems with Optical Amplifiers," J. Lightwave Technol., vol. 8, pp. 1816–1823, Dec. 1990.

A. Elrefaie et al., "8 Gb/s Current Modulation of Semiconductor Optical Amplifiers," Proc. ECOC '90, p. 625, Sep. 1990.

E. L. Goldstein et al., "Multiwavelength fiber–amplifier cascades in undirectional interoffice ring networks," OFC/IOOC '93 Technical Digest.

A. F. Elrefaie et al., "Fibre Amplifiers In Closed–Ring WDM Networks," Electronics Letters, vol. 28, No. 25, Dec. 3, 1992.

(List continued on next page.)

*Primary Examiner*—Rodney B. Bovernick
*Assistant Examiner*—Hemang Sanghavi

[57] ABSTRACT

A method and system for the transmission of signals over a large capacity local access network which provides users a dedicated two-way link to a central office. The network is built along a single optical fiber ring. Connection to the fiber is obtained by combining time and frequency division multiplexing techniques and by using an optical channel-dropping filter. Optical signals are generated at the central office. The users have a simple device integrated with the channel-dropping filter to receive and transmit data without the use of an optical source.

9 Claims, 4 Drawing Sheets

OTHER PUBLICATIONS

Tsong–Ho Wu et al, "High–Speed Self–Healing Ring Architectures for Future Interoffice Networks," IEEE 1989.

M. Zirngibl et al, "Digitally Tunable Laser Based on the Integration of a Waveguide Grating Multiplexer and an Optical Amplifier," IEEE Photonics Technology Letters, vol. 6, No. 4, Apr. 1994.

G. Eisenstein et al., "A Multiple Quantum Well Optical Amplifier/Modulator Integrated with a Tunable DBR Laser," Proc. IOOC '89, Kobe, Japan, 1989, Paper 19C2.

M. Zirngibl et al, "Efficient 1×6 Optical Power Splitter Based on InP," Electronic Letters, vol. 28, No. 25, Jun. 18, 1992.

B. Glance et al., "FDM Systems," OFC '93, San Jose, CA, Technical Digest Paper, TUN1.TM 920925–04.

1

LARGE CAPACITY LOCAL ACCESS NETWORK

This is a continuation of application Ser. No. 08/350,360, filed on Dec. 6, 1994, now abandoned.

FIELD OF THE INVENTION

This invention relates to a large capacity local access network providing users a dedicated two-way link to a central office. More particularly, the network is built along a single optical fiber ring.

BACKGROUND OF THE INVENTION

Fiber optic cable networks have expanded tremendously in the telecommunications industry over the last several years. At the same time new communication services have been created, making a host of services like electronic mail and teleconferencing more widely available and stimulating growth of digital networks.

One of the many advantages of fiber optic cables is the optical bandwidth of the fiber, allowing for substantially more information to be sent on a cable significantly smaller than a copper wire. Additionally, fiber cables have increased capacity by allowing a greater number of users to share the same fiber cable by frequency or wavelength division and time division of the signals.

Optical wavelength-division-multiplexing (WDM) is used to take advantage of the enormous optical bandwidth of a fiber. WDM networks based on wavelength routing generally have a ring architecture and are attractive for wide bandwidth multiple user applications, such as teleconferencing.

One drawback of WDM systems, however, is that complex optical hardware including an optical source is required for each group of users at their connection point to the fiber, for multiplexing and demultiplexing the signals.

SUMMARY OF THE INVENTION

The present invention overcomes the disadvantages of the prior art by providing a channel-dropping filter for processing a given number of information signals received simultaneously over a fiber, comprising a wafer, a demultiplexer for demultiplexing the frequency components, optical waveguides having active sections integrated on the wafer and a multiplexer for multiplexing the frequency components.

In preferred embodiments, the channel-dropping filter provides users high bit-rate dedicated two-way links to a central office over a network. The network has a ring architecture built along a single fiber running from and back to the central office.

The present invention can be used in networks in which optical signals are generated at a central office only, putting most of the optical hardware at the central office and allowing sharing of this equipment by users connected to the central office through a fiber by optical channel add-drop filters.

A local access network using the present invention can provide at least 210 dedicated two-way links operating at 100 Mb/s between users and a central office. The traffic is supported by a single optical fiber running along a ring architecture with optical signals generated at the central office only. The system operation is based on time division multiplexing (TDM) combined with wavelength division multiplexing (WDM). The performance of such a network and its efficient use of the hardware makes this system an attractive solution for providing users direct access to a local central office.

DETAILED DESCRIPTION OF THE PREFERRED EMBODIMENT

Figure 1:
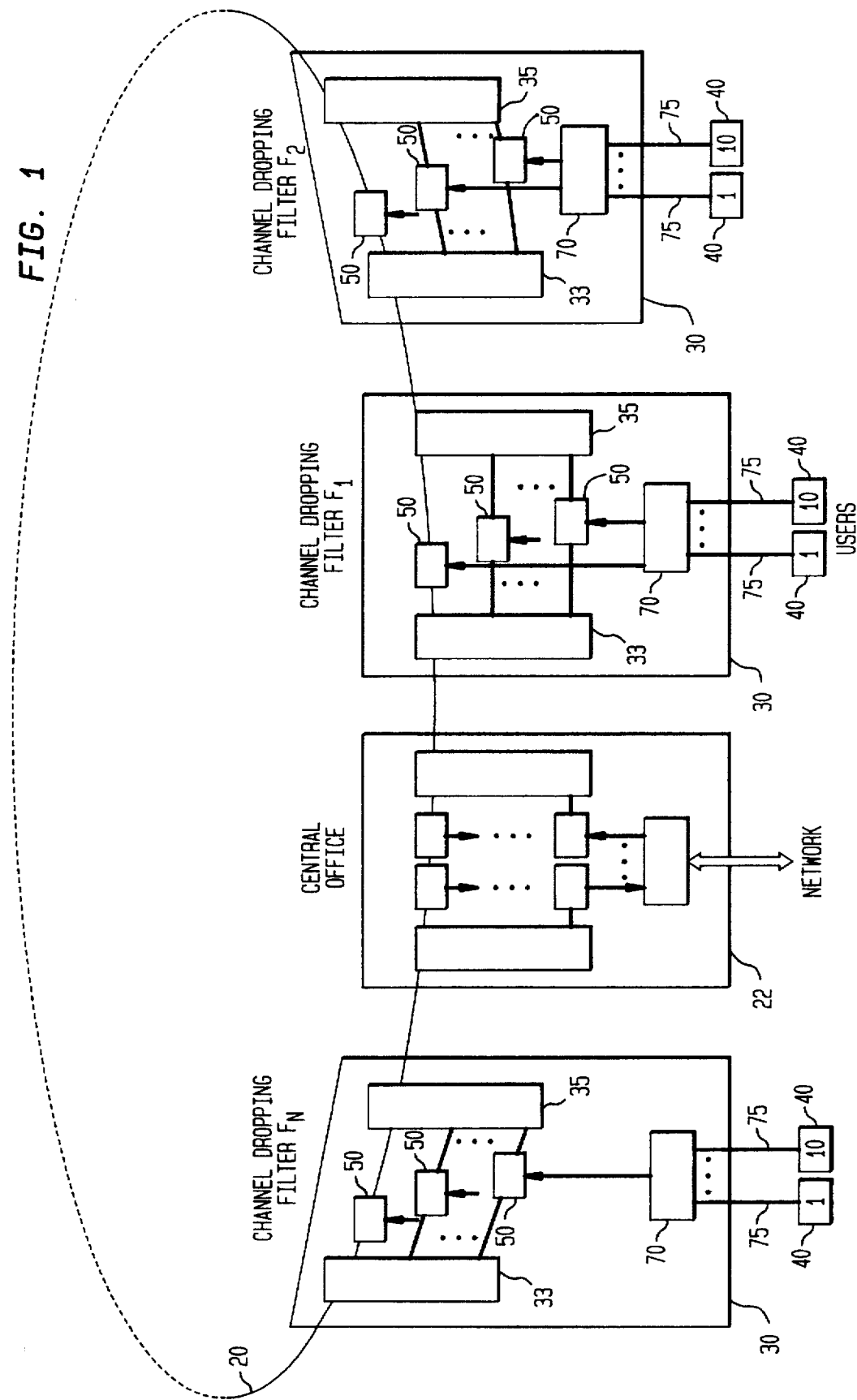
FIG. 1 illustrates a large capacity local access network in accordance with this invention.

FIG. 1 shows an example of a large capacity local access network having a ring architecture built along a single optical fiber ring 20. Starting from a central office 22, the fiber ring 20 connects a number of identical channel-dropping filters 30 distributed along its path before coming back to the central office 22. As shown in FIG. 1, the network contains a total of N channel-dropping filters 30.

Each channel-dropping filter 30 can accommodate up to ten users 40 for connection to the fiber 20, and provides selection, detection, modulation, and amplification of the optical signals generated by the central office 22. Active elements 50 of the channel-dropping filter 30 allow users 40 to detect and transmit data without the use of an optical source. This arrangement places most of the optical hardware at the central office 22 and allows sharing of this equipment by the users 40.

Figure 2:
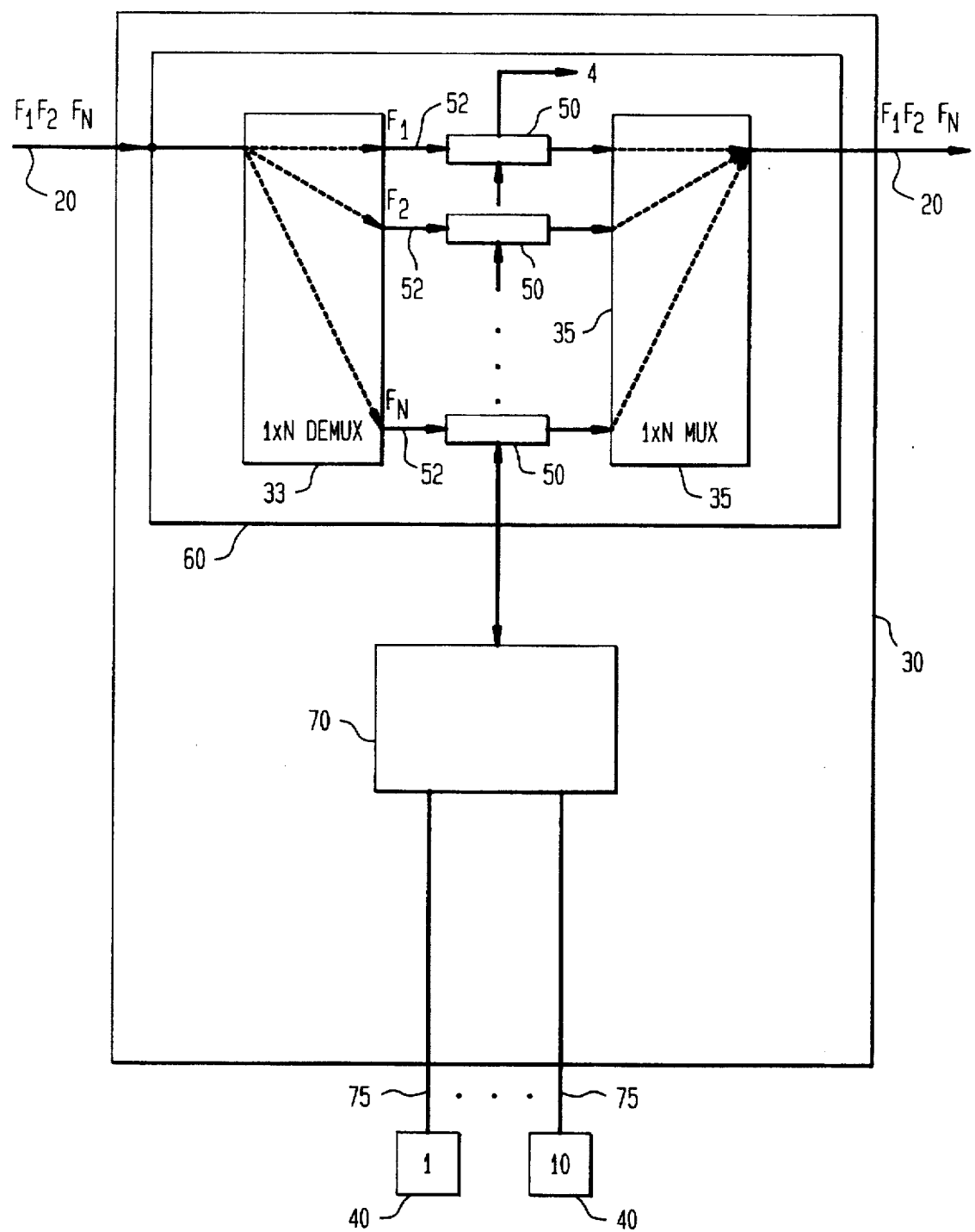
FIG. 2 depicts the active wafer component of a channel-dropping filter.

FIG. 2 shows an optical channel-dropping filter 30 in more detail, and includes an integrated 1×N demultiplexer 33 and an integrated 1×N multiplexer 35. One example of such a 1×N demultiplexer or multiplexer is Dragone's frequency router, as described in U.S. Pat. No. 5,136,671 entitled "Optical Switch, Multiplexer, and Demultiplexer," filed Aug. 21, 1991, the disclosure of which is incorporated herein by reference. The demultiplexer 33 and multiplexer 35 are connected at their N ports through optical waveguides 52 containing active sections 50. The entire circuit is integrated on an active wafer 60, for instance an InP wafer.

As shown in FIG. 2, the input signal to the channel-dropping filter 30 consists of up to N frequency components, $F_1$ to $F_N$, corresponding to the total number of channel-dropping filters 30. Each frequency component is demultiplexed by one of the N ports of the demultiplexer 33. Each of the N frequency components then passes through a separate active section 50 on the wafer 60. The frequency components $F_1$ to $F_N$ are subsequently multiplexed by the multiplexer 35 and exit the single output port of the channel-dropping filter 30.

Figure 3:
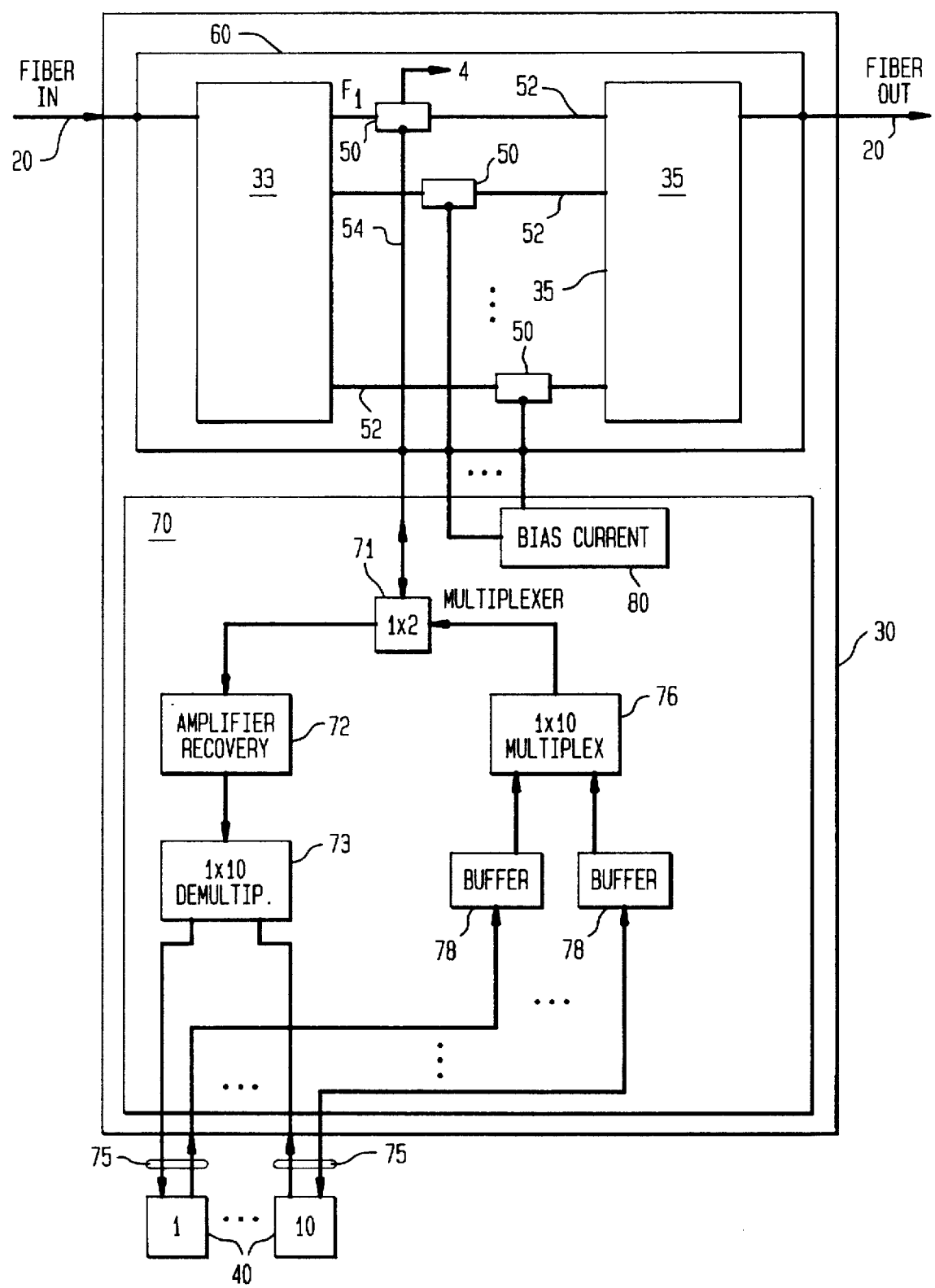
FIG. 3 shows the first channel-dropping filter in a network after the central office, including the active wafer, data recovery and amplification circuit, and TDM multiplexers for user connections.

FIG. 3 shows the first channel-dropping filter 30 in the network. Only frequency component $F_1$ is dropped at this filter by the active section 50 in its path, and passed through circuit 70 prior to reaching its user destination 40. All other frequency components, $F_2$ through $F_N$, in this filter 30 are amplified to compensate for transmission loss. Each channel-dropping filter 30 thus provides the ability to control a single frequency component of the total set of frequency components, $F_1$ through $F_N$.

Figure 4:
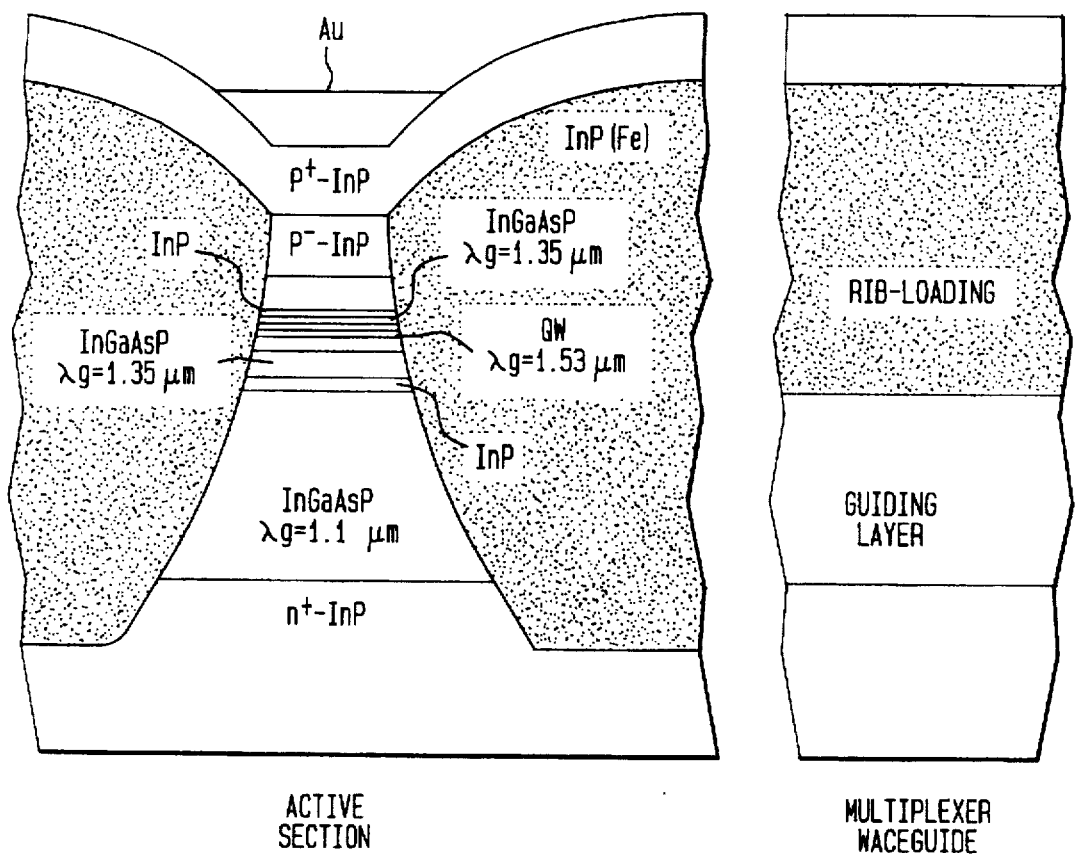
FIG. 4 gives a representation of the cross section of the wafer, showing the layer structure of the active section.

The active sections 50 are doped areas in each optical waveguide 52 connecting the demultiplexer 33 and the multiplexer 35. A cross section of an active section 50 on wafer 60 is presented in FIG. 4, showing the layer structure of the active section 50. The epitaxial growth and regrowth for the active section 50 is accomplished by low pressure (100 torr) metalorganic vapor phase epitaxy. The substrates used are S-doped ($2 \times 10^{18}$/cm$^{-3}$). As is well known to those skilled in the art, to produce the continuously graded portion of the rib waveguide structure, the group three organometallic flows as well as the arsine are ramped through three intermediate compositions to cover the range of 1.1 to 1.35 μm bandgap. To manufacture the active region, 1.58 μm InGaAsP quantum wells (QW) and 1.35 μm bandgap InGaAsP barriers lattice matched to InP are used. Diethyl zinc and disilane are the sources for the p- and n-type dopants.

Passive waveguides 52 and active sections 50 are defined by wet-chemical etching after the first growth. Then, semi-insulating InP is grown on the wafer 60 except on the active sections 50. The last regrowth, a heavily doped p$^+$-InP, with a p$^+$-InGaAsP cap serves as a contact layer. Processing is completed by metalizing the contacts with gold (Au).

Users 40 are connected to the network through the metallized contact layer of the active sections 50. FIG. 3 shows a connection 54 linking the users 40 to frequency component $F_1$ through circuit 70. This connection 54 is used for applying a DC biasing current to the active section 50 when receiving or transmitting user signals over the network.

Three control functions are performed by the active sections 50 on the wafer 60. The first two control functions are demodulating and modulating a frequency component; the third function is providing constant gain to a frequency component which is not dropped.

First control function: If the multiplexer 71 in FIG. 3 is in receive mode, the active section 50 is unbiased or reverse biased by the application of a DC current through connection 54. In this state, active section 50 is a demodulator and will absorb incoming photons, thus acting as a photodiode to detect data carried by the frequency component flowing through.

Second control function: When the multiplexer 71 is in transmit mode, the active section 50 is forward biased by application of a DC current through connection 54. The active section 50 thus becomes an amplifier with gain varied by the biasing current. The active sections 50 can now be used as an amplitude modulator to transmit data at the carrier frequency.

Third control function: Each active section 50 can also provide the gain needed to compensate for the transmission loss of the channel-dropping filter 30 and the fiber 20. All active sections 50 in a particular channel-dropping filter 30 are in this state except for the single active section 50 serving as a user connection by dropping a frequency component. Uniform gain is achieved by applying the appropriate forward biasing through bias current generator 80.

Fixed-tuned lasers at the central office 22, each tuned to one of the frequency values demultiplexed by a channel-dropping filter 30, provide the optical signals for two-way communication between the central office 22 and the users 40 connected to the channel-dropping filters 30. The optical signals are ON-OFF modulated by an external modulator in series with each laser and, subsequently, frequency and time multiplexed in the optical fiber 20. There are thus N frequency carriers, each carrying interleaved time slots of data, and a continuous wave (CW) carrier assigned successively to the users 40 sharing the same carrier frequency.

Each channel-dropping filter 30 provides connectivity to a different set of up to ten users 40 sharing the same wavelength by time-division multiplexing. The central office 22 communicates with the users 40 by transmitting interleaved time slots of data on the CW carrier. The users 40 utilize the active sections 50 for demodulating the signal addressed to them, and also to modulate the amplitude of the CW carrier for sending their data to the central office 22. Such a simple transreceiver can detect and transmit data up to 2 Gb/s. Each frequency component can thus provide a 1 Gb/s two-way link.

As shown in FIG. 3, the electrical signal detected by an active section 50 during a time slot of data transmitted by the central office 22 is processed by circuit 70 before reaching its user destination 40. The signal is passed through a multiplexer 71 and switched to a data recovery and amplification circuit 72. The recovered data are then switched by a TDM demultiplexer 73 to a user 40 destination along a coaxial cable 75. In the following CW time-slot, the user data previously stored in a buffer 78 are multiplexed by multiplexer 76 and switched to the active section 50 by multiplexer 71. These data are transmitted by modulating the amplitude of the CW carrier. The same process is repeated successively for the ten users 40 by time-division multiplexing. The users 40 receive and send data through individual coaxial cables 75 attached to the channel-dropping filter hub 30. Correct multiplexing of the data bursts originating from these users 40 is assured by storing their data in buffer 78 at the hub location and retrieving the data in the proper sequence.

The frequency components passing through the channel-dropping filter 30 which are not dropped for user modulation and demodulation, are amplified in the active section 50. A forward current is applied to the active section 50 through a bias current generator 80 with a gain adjusted to compensate for the transmission loss in the channel-dropping filter 30 and fiber 20. One skilled in the art can calculate the bias current necessary based on the known loss in the filter 30 and fiber 20. Consequently, nonuniform gain of amplifiers required in the ring 20 can be compensated.

The total number of users 40 supported by the local access network increases with the number of channel-dropping filters 30 distributed along the fiber 20. However, the total number of users 40 is limited by the cumulative degradation of the signal-to-noise ratio (SNR) along the chain of channel-dropping filters 30.

There are two main causes of degradation. One is the crosstalk between branches of the demultiplexer 33 and multiplexer 35, the other is the spontaneous emission noise generated by the amplifying active sections 50. Increasing the number of channel-dropping filters 30 affects both sources of noise. The largest degradation is thus observed by the receiver located at the end of the chain.

Crosstalk is defined as the power ratio of the demultiplexed component to the component exiting one of the unwanted outputs. The component of the demultiplexed signal existing unwanted outputs is caused by power leaking into N−1 unwanted outputs in the 1×N demultiplexer 33.

In each channel-dropping filter 30, the signals are amplified by an active section 50 and then combined by the multiplexer 35. Most of the crosstalk components caused by the demultiplexer 33 are filtered out by the multiplexer 35, but a residue crosstalk still exists in the output of the channel-dropping filter 30. This residue affects the amplitude of the output signal, depending on the phase of the N components.

Furthermore, the active sections 50 generate spontaneous emission noise in the amplifier mode. Because of the routing properties of the multiplexer 35, most of this noise is routed to the unused outputs of the channel-dropping filter. The noise added to a frequency component exiting a channel-dropping filter 30 is the spontaneous emission noise generated within the passband routing the frequency component.

When the crosstalk effect and the spontaneous emission noise are evaluated for a modulation rate of 2 Gb/s and a noise bandwidth of 50 GHz, it is calculated that the optical SNR must be larger or equal to 2.72 to achieve a bit error rate of $10^{-9}$. These figures assume an initial power $P_0$ of 1 mW, a passband B equal to 50 GHz for frequencies spaced by 1 nm around an optical wavelength of 1.55 μm, and a transmission loss per channel-dropping filter (including some small fiber loss) equal to 13 dB. As a result, the SNR expression becomes, for a crosstalk of −25 dB, the following:

$$SNR_{opt} = \frac{1025}{N} \frac{\left[\frac{317-N}{316}\right]}{\left[\frac{315+N}{316}\right]} \geq 2.72$$

This condition is satisfied for N<=21. Therefore, under the above analysis, the proposed network can support, even for the worst condition of crosstalk effect, 21 channel-dropping filters 30, each serving ten users 40, or a total of 210 users.

I claim:

1. A local access network including a central office in communication with a fiber ring and a plurality of users for transmission of optical signals over a continuous wave between said central office and each of said plurality of users, comprising:

optical signal generating means at said central office for generating an optical signal having a plurality of frequency components;

a modulator and a detector located at said central office; and a plurality of channel-dropping filters situated along said fiber ring for selectively detecting, modulating and amplifying said plurality of frequency components, each said channel-dropping filter including a 1×N demultiplexer having N ports, a 1×N multiplexer having N ports, and a plurality of optical waveguides each having an active section, said N ports of said demultiplexer being connected to corresponding ones of said N ports of said multiplexer through one of said optical waveguides, said demultiplexer, said multiplexer and said optical waveguides being integrated on an InP wafer, wherein each of said frequency components corresponds to a particular one of said channel-dropping filters and wherein, in order to transmit information between a first channel-dropping filter and a second channel-dropping filter, said first channel-dropping filter modulates the frequency component corresponding to said first channel-dropping filter with said information and said central office detects said information and modulates the frequency component corresponding to said second channel-dropping filter with said information.

2. A network according to claim 1, wherein said demultiplexer and said multiplexer each comprise a frequency router.

3. A network according to claim 1, wherein each said channel-dropping filter provides connectivity to a set of ten users.

4. A network according to claim 1, further comprising means for reverse-biasing said active sections and means for forward-biasing said active sections.

5. A network according to claim 4, wherein said frequency components are modulated by forward biasing said active sections with a variable current.

6. A network according to claim 4, wherein said frequency components are detected by reverse biasing said active sections.

7. A local access network including a central office in communication with a fiber ring and a plurality of users for transmission of optical signals over a continuous wave between said central office and each of said plurality of users, comprising:

optical signal generating means at said central office for generating an optical signal having a plurality of frequency components;

a modulator and a detector located at said central office; and a plurality of channel-dropping filters situated along said fiber ring for selectively detecting, modulating and amplifying said plurality of frequency components, each said channel-dropping filter including a 1×N demultiplexer having N ports, a 1×N multiplexer having N ports, and a plurality of optical waveguides each having an active section, said N ports of said demultiplexer being connected to corresponding ones of said N ports of said multiplexer through one of said optical waveguides, said demultiplexer, said multiplexer and said optical waveguides being integrated on an InP wafer, wherein each of said frequency components corresponds to a particular one of said channel-dropping filters and wherein, in order to transmit information between a first channel-dropping filter and a second channel-dropping filter, said first channel-dropping filter modulates the frequency component corresponding to said first channel-dropping filter with said information and said central office detects said information and modulates at least one of said frequency components of said optical signal, said central office providing a different modulation for each of said channel-dropping filters.

8. A local access network including a central office in communication with a fiber ring and a plurality of users for transmission of optical signals over a continuous wave between said central office and each of said plurality of users, comprising:

optical signal generating means at said central office for generating an optical signal having a plurality of frequency components;

a modulator and a detector located at said central office; and a plurality of channel-dropping filters situated along said fiber ring for selectively detecting, modulating and amplifying said plurality of frequency components, each said channel-dropping filter including a 1×N demultiplexer having N ports, a 1×N multiplexer having N ports, and a plurality of optical waveguides each having an active section, said N ports of said demultiplexer being connected to corresponding ones of said N ports of said multiplexer through one of said optical waveguides, said demultiplexer, said multiplexer and said optical waveguides being integrated on an InP wafer, wherein each of said frequency components corresponds to a particular one of said channel-dropping filters and wherein, in order to transmit information between a first channel-dropping filter and a second channel-dropping filter, said first channel-dropping filter modulates the frequency component corresponding to said first channel-dropping filter with said information and said central office detects said information and modulates at least one of said frequency components of said optical signal utilizing at least one of a plurality of fixed tuned lasers, each said fixed tuned laser corresponding to a particular one of said channel-dropping filters.

9. A network according to claim 8, wherein said modulator further comprises an external modulator connected in series with each of said fixed tuned lasers.

* * * * *